Sept. 29, 1959      I. J. TAYLOR      2,906,162

HIGH SPEED CAMERA

Filed June 5, 1951      6 Sheets-Sheet 1

INVENTOR

IVAN J. TAYLOR

BY

ATTORNEYS

Sept. 29, 1959   I. J. TAYLOR   2,906,162
HIGH SPEED CAMERA
Filed June 5, 1951   6 Sheets-Sheet 2

INVENTOR
IVAN J. TAYLOR
BY
ATTORNEYS

Sept. 29, 1959     I. J. TAYLOR     2,906,162
HIGH SPEED CAMERA
Filed June 5, 1951     6 Sheets-Sheet 4
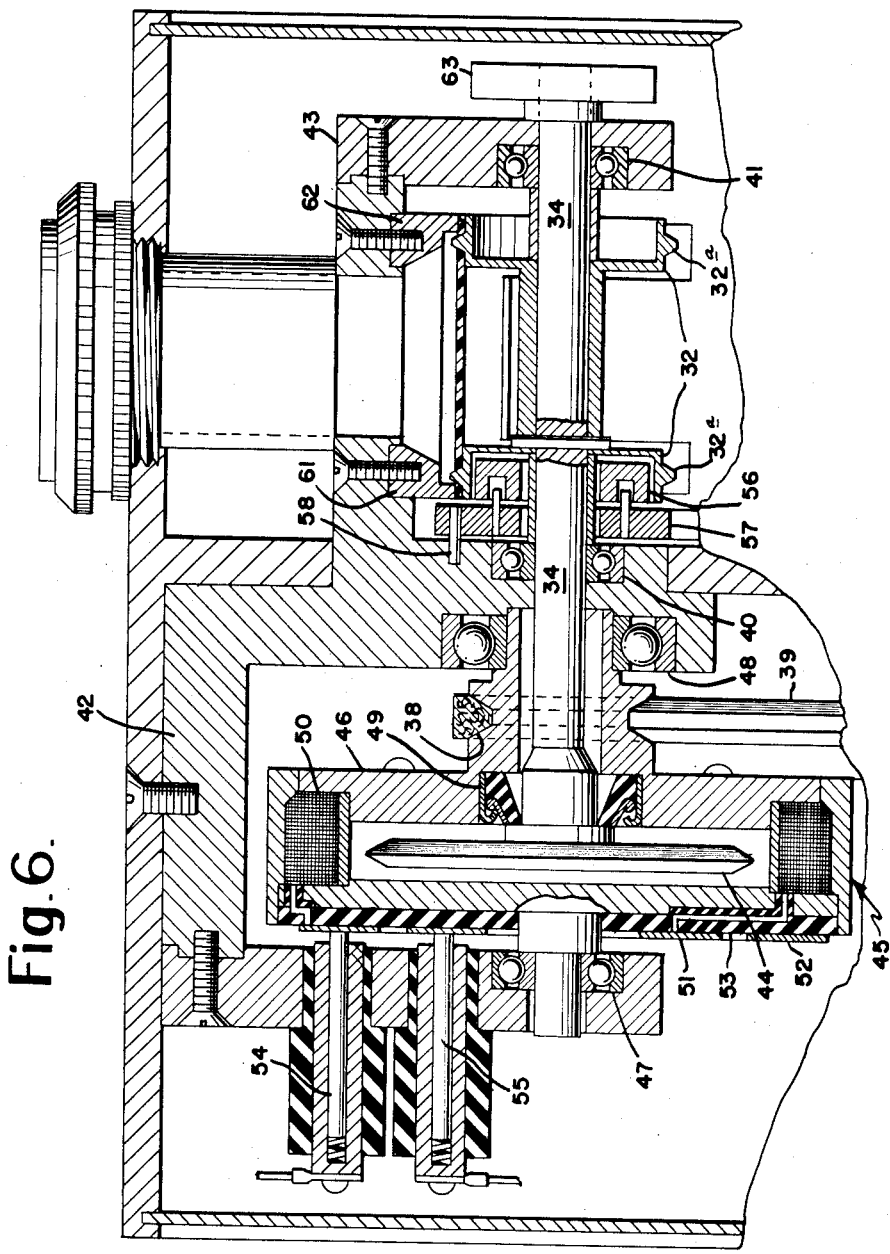
INVENTOR
IVAN J. TAYLOR
ATTORNEYS

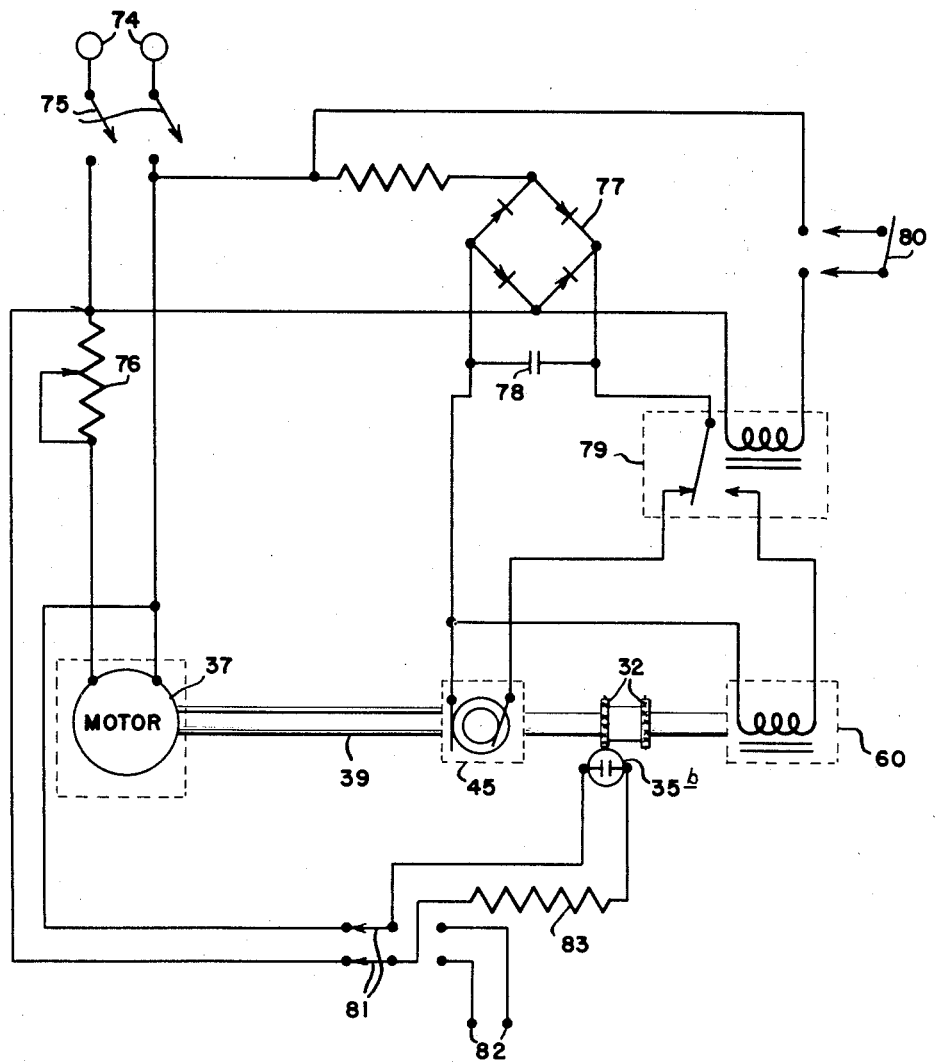

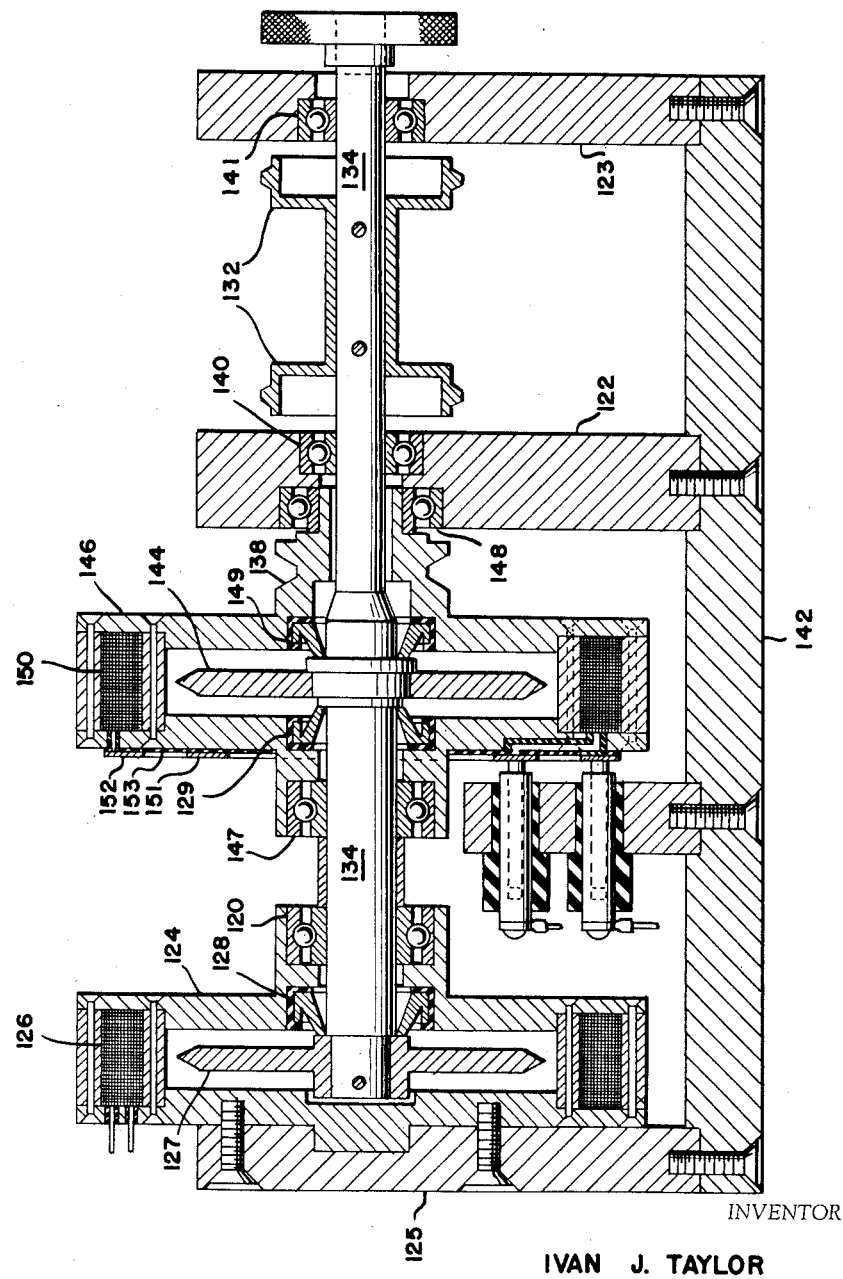

United States Patent Office 2,906,162
Patented Sept. 29, 1959

2,906,162

HIGH SPEED CAMERA

Ivan J. Taylor, Portsmouth, Va.

Application June 5, 1951, Serial No. 230,018

4 Claims. (Cl. 88—16)

(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial No. 181,539, filed August 25, 1950, entitled, "High Speed Camera," now abandoned.

This invention relates to photography in general and in particular to film transport mechanisms operative to drive a film strip at high speed for short periods of time with a minimum acceleration and deceleration time at the beginning and end of each period.

In many applications involving a study of transient phenomena it is desirable to make photographic records. To obtain such records it is common practice to derive or convert the transient disturbance into a form of variations in electrical signals which may be displayed on the face of a cathode ray tube where it can be photographed. Frequently, such photography is not of the shutter controlled nature commonly employed in moving picture photography but is of the open shutter nature wherein the film itself is moved beneath an open shutter and lens during the occurrence of the transient, the signal variation being applied to the cathode ray tube in such a manner as to produce cathode ray beam deflection proportional to the transient signal and transversely to the direction of travel of the film.

The result of this operation is that a line is traced on the film having transverse positional variation in accordance with the transient variation to be retained.

In such instances it is usually desirable to move the film at a very high uniform velocities, and further to avoid unnecessary waste of film in acceleration to uniform velocity and subsequent deceleration before and after the occurrence of a transient, it is desirable to start the film movement at the start of the transient and stop the film movement at the termination of the transient. Such operation places very stringent requirements on the film transport mechanism particularly with regard to the operating speed, acceleration to the operating speed and rapid braking to a stop.

Accordingly, it is an object of the present invention to provide a photographic instrument particularly suited for recording high speed transient phenomena during their brief existence.

Another object of the present invention is to provide a photographic instrument for recording indications obtained on a cathode ray tube.

Another object of the present invention is to provide a transport mechanism for a recording medium which must be accelerated at very high rates.

Another object of the present invention is to provide a film transport mechanism capable of rapidly accelerating the film to a desired speed and of bringing the film to a stop where desired.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 6 is a like view taken on the line 6—6 in Fig. 3;

Fig. 10 is a wiring diagram showing the connections for the operation of the present invention; and Fig. 11 shows a variant of the basic film drive mechanism of Fig. 6.

In accordance with the basic features of the present invention, a photographic device is provided which is specially suited for recording transient phenomena of such character as can be readily converted into a variable light beam, or design, such as for example that presented on the face of a cathode ray tube. This photographic device employs a recording medium, such as a photographic film, which is moved at a constant speed during the occurrence of the transient to be recorded, the speed being much higher than any speed attained by other prior devices of a similar nature. In the novel device a periodically opening shutter is not used to expose the film at regular intervals as in conventional movie photography, but rather the film is continuously exposed to focussed light during its travel so that a continuous "streak" is made on the film. Light is delivered to the film through a suitable lens system. Where a single light source is in the field of view of the lens, the result is a line on the film whose position thereon follows the movement of the light entering the lens. In the novel device, the film is brought quickly to its exceptionally high speed, and it is then an easy matter to record extremely rapid variations in the position of a light spot on the face of a cathode ray tube, so that rapidly varying signals may be recorded upon occurrence so that they may be examined later at leisure.

Figure 1:
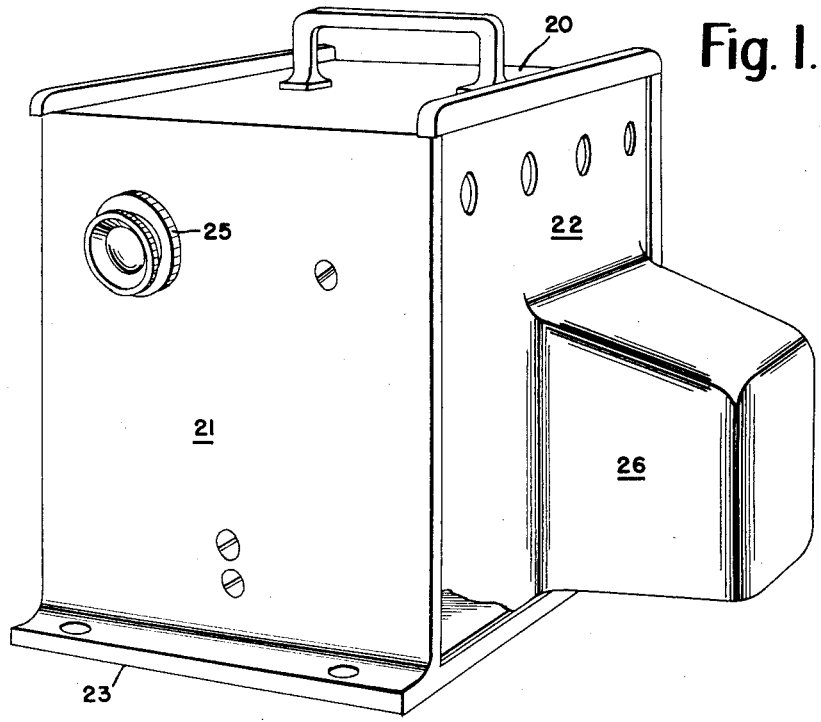
Fig. 1 is a front elevational view in perspective, of the camera of the present invention.

With reference now to Fig. 1, an external view of a camera constructed in accordance with the teachings of the present invention is shown. This camera comprises a housing including a top member 20, front panel 21, side panel 22 and base member 23, the rear panel 28 and opposing side panel 24 being hidden from view. This opposing side panel 24 is made readily removable and is mounted in any suitable manner so as to form a light-tight joint with the adjacent members of the camera case. Mounted in the front panel of the camera case is a lens 25 for the admission of light from subjects to be photographed. As is customary, it is desirable that the lens 25 be provided with some form of variable aperture diaphragm such as a multi-segment iris for controlling the amount of light admitted by the lens.

Side panel 22 carries a protrusion 26 which provides additional room for mounting a drive motor for the camera mechanism. This motor, not shown in Fig. 1, is subsequently described and shown in other figures.

Figure 2:
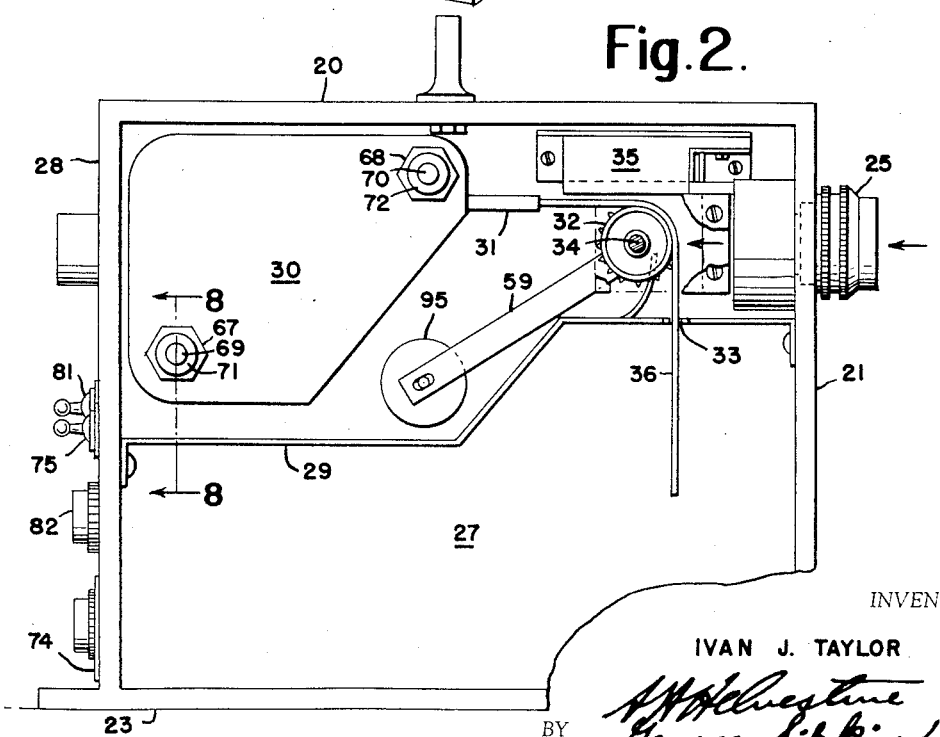
Fig. 2 is a side elevational view with the cover removed from the film side of the camera.

The interior of the camera is divided into two compartments, a film compartment and a drive compartment, by a partition 27, running parallel to the side panels 22 and 24. The first of these, the film compartment, including the lens 25, is shown in Fig. 2 as it would be viewed with the side panel 24 removed to provide access thereto. It should be noted that the lower right hand corner of Fig. 2 is partly cut away merely for convenience in drawing. This showing of Fig. 2 indicates the partition 27 which forms a light-tight seal with the top member 20, front panel 21, base member 23 and rear panel 28. This film compartment is divided by partition 29 into two sections, an upper section for unexposed film and a lower section for exposed film. Unexposed film which typically is of the 35 millimeter double row perforated variety, is carried within a magazine 30 which is mounted within the upper section whereas exposed film is allowed to fall loosely in the lower section. Film magazine 30 is itself light-proof so that it need not be stored in absolute darkness and so that the camera can be loaded in a lighted enclosure; but it is, of course, necessary that the camera be unloaded in darkness. The film magazine 30 has a discharge slot 31 substantially directly in back of the lens 25. Film stored within the magazine 30, which will be described in detail at a later point in the specification, is withdrawn through the film slot 31, and passes in a path which is a short substantially straight line to the sprocket 32, engages about 90° of the outer periphery of the sprocket and then falls directly through slot 33 in the partition 29 to the film-receiving or "storage" section or compartment below the partition 29. Slot 33 in the partition serves as a film guiding means to direct the film into the film-receiving compartment. Sprocket 32 is carried on shaft 34, one end of which is shown in Fig. 2.

Mounted in the upper magazine section of the film compartment along the path of movement of the film is a timing device 35 which is a light-tight case affixed by means of suitable brackets to the partition 27. This timing device contains a suitable light source such as a miniature neon tube, not shown, which in operation flashes at a known frequency. Light from this source is delivered through a small aperture in the case of timing device 35 to reach film 36 in a region near the perforations where it will not obscure the signal to be photographed. Thus, as the film is driven through the camera in operation, a series of dots will be produced on the film to indicate by their spacing the rate of travel of the film at any instant during its travel.

Figure 3:
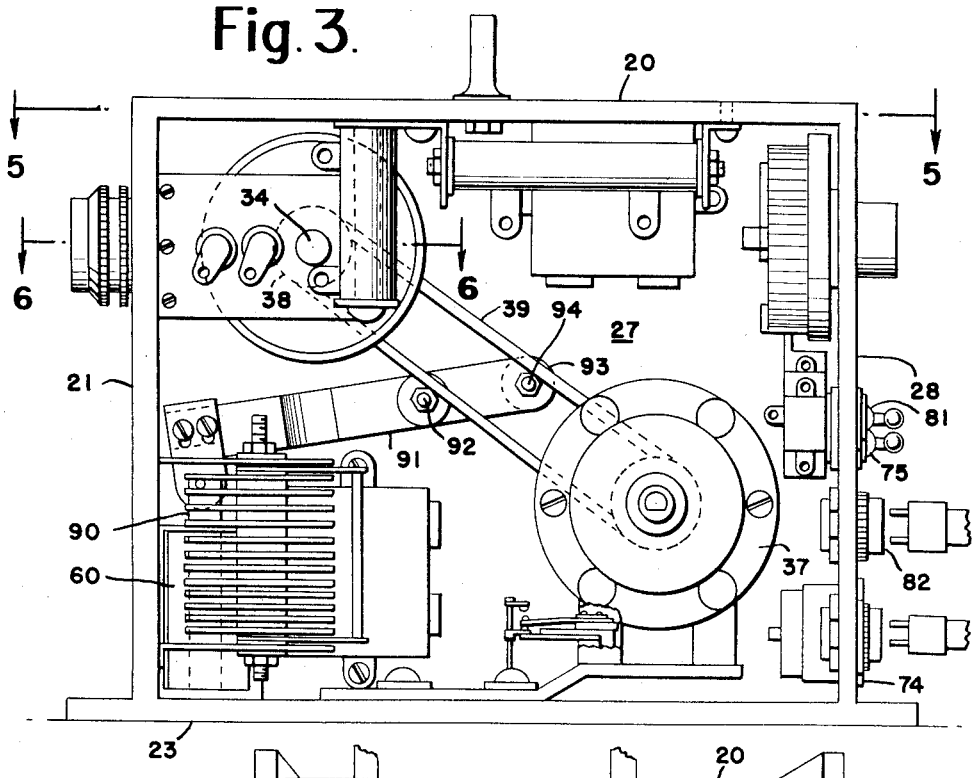
Fig. 3 is a like view showing the motor drive side of the camera.

With reference now to Fig. 3, a view of the drive compartment of the camera is shown with the side panel 22 removed. In this figure, the partition 27 is shown as is also the opposite end of shaft 34, previously discussed in connection with Fig. 2. Fig. 3 shows a motor 37 mounted by means of a suitable bracket upon base member 23. Motor 37 drives a suitable pulley 38 through belt 39, subsequently described.

A sectional view along the line 6—6 of Fig. 3 is shown in Fig. 6 to illustrate in detail components mounted on shaft 34 and operatively associated therewith. Shaft 34 is journalled by ball bearings 40 and 41 which are carried by walls of a framework (see also Fig. 5) consisting of a housing bracket 42 and end housing 43. The film drive sprocket 32 is fixedly attached to shaft 34. As indicated in Fig. 6, the sprocket 32 comprises two spaced rows of suitable tooth-like protrusions 32-A which engage the standard 35 millimeter movie film for which this particular embodiment of the invention is intended to operate, it being understood that with proper design other film sizes such as 16 millimeter could be employed. At one end of shaft 34 is mounted a disc member 44 which forms a component of a magnetic fluid clutch indicated in its entirety by the reference numeral 45. Magnetic clutches of a type utilizable in this invention are known.

A second main component of the magnetic fluid clutch 45 is the clutch housing 46. This clutch housing 46 is rotatable in bearings 47 and 48 in the housing bracket 42. As shown in Fig. 6, the clutch housing 46 has unitary therewith the pulley 38 and a projecting tubular portion to which the inner race of the bearing 48 is fixed; this race being rotatable in the outer race carried by the housing bracket 42. The pulley 38 associated with the clutch housing 46 is, as previously mentioned, coupled to the drive motor 37 by means of belt 39. The space within the clutch housing between it and the disc member 44 is filled with a magnetizable clutch-fluid mixture such as oil containing carbonyl iron powder. This mixture is held within the housing by an oil seal indicated generally by the numeral 49 which prevents oil from leaking through the necessary opening for shaft 34. A magnetic field is set up in the clutch housing and delivered thereby to the oil to produce magnetization and, in effect, solidification therein by energizing a coil 50. Coil 50 is energized by delivering a current thereto through insulated annular slip rings 51, 52 disposed on the side of the clutch housing insulated therefrom by a disc 53 of insulating material. Annular slip rings 51 and 52 are contacted by spring loaded brushes 54 and 55 which are suitably connected to a suitable source of direct current.

As indicated in Fig. 6, an internally expanding mechanical brake is placed on the shaft 34 cooperating with one of the drums of the sprocket 32 as a brake drum or braking member. Brake shoe 56 is pushed into contact with sprocket 32 by an actuating member 57 which is loosely around the shaft 34 and is pivoted on pin 58 controlled by bar 59 (Fig. 2) though a suitable linkage by a control solenoid 60 (Fig. 3).

Other components shown in Fig. 6 include film hold-downs 61 and 62 and thumb-wheel 63. The hold-downs keep the film in engagement with the sprocket protrusions while the thumb-wheel 63 provides a means of manually advancing the film during the initial loading operation.

Figure 5:
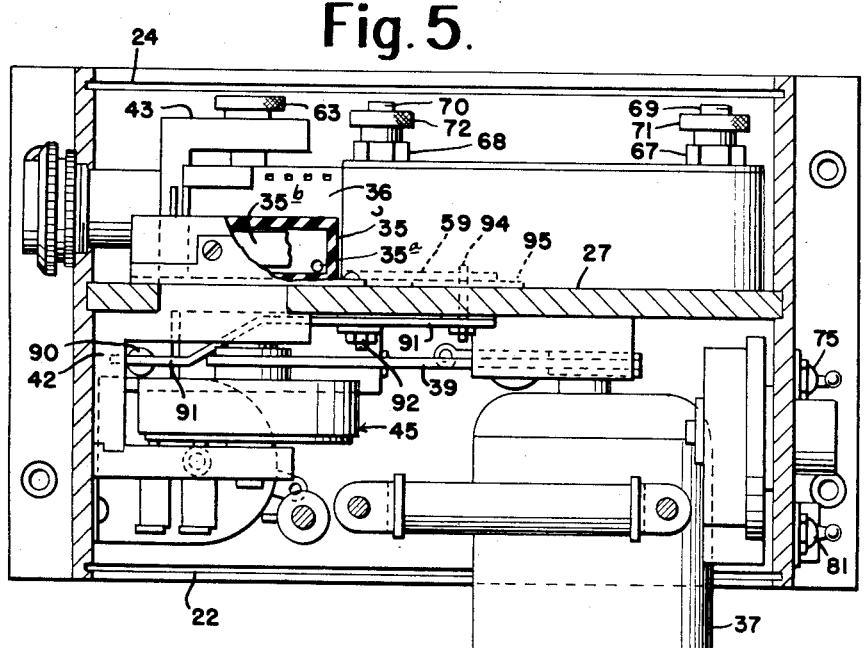
Fig. 5 is a horizontal cross-sectional view taken on the line 5—5 in Fig. 3.

With reference now to Fig. 5, a view is shown looking down into the camera with the top member 20 removed. Both compartments are shown therein with the side panels 22 and 24 and the partition 27 in place. Practically everything shown has been described previously, but the cooperation of the two compartments on the sides of partition is indicated. Also is shown the brake linkage together with details of the timing device 35, such as the neon tube 35-B and aperture 35-A through which the light flashes from the neon tube pass to the film 36.

The brake linkage employed may be of any suitable design capable of applying the solenoid force to the brake shoe. Solenoid 60 has its armature 90 suitably connected to a solenoid bar 91, the latter being bent into a form permitting it to be brought close to the partition 27. Solenoid bar 91 is pivoted at an intermediate point thereof by a suitable pivot 92. The intermediate pivot location therefore inverts the solenoid force so that the force of solenoid 60, which is exerted toward the base member 23, is converted to a force directed away from base member 23 as existant at the end 93 thereof. Disposed near the end 93 and rigidly affixed thereto is a brake bar pin 94 extending at right angles to solenoid bar 91 and extending through the partition 27 into the film chamber where it engages an elongated slot in the bar 59. Bar 59 thus receives from solenoid 60 a force directed away from base 23 and applies this force to the brake actuating member 57 to bring brake shoe 56 into contact with sprocket 32. The opening in partition 27 is in the form of a slot permitting motion of brake bar pin 94.

The drive compartment is not light-tight, hence attention must be directed to the manner wherein brake bar pin 94 extends through partition 27 to insure that light does not enter the film chamber at this point. To this end a plate 95 may be attached to brake bar pin 94 in the film chamber adjacent to partition 27, such plate being of sufficient diameter to fully cover the slot in partition 27.

Figure 7:
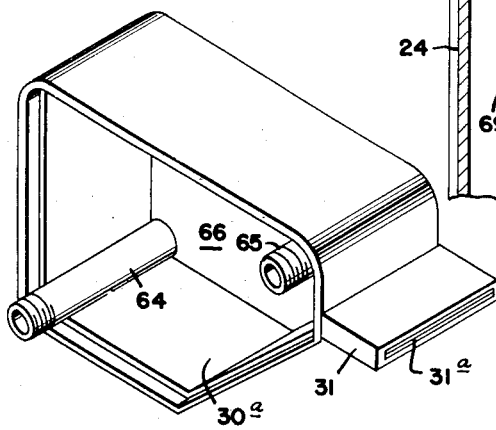
Fig. 7 is a perspective view of the film magazine.
Figure 8:
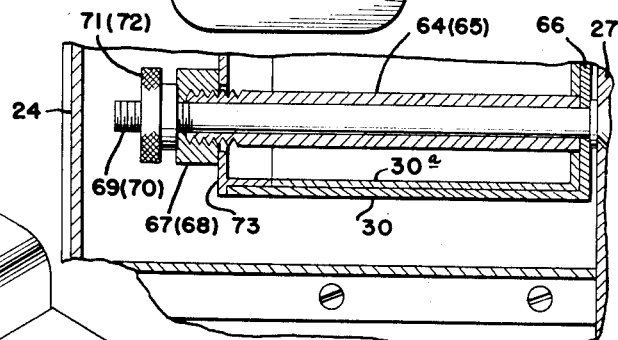
Fig. 8 is a vertical cross-sectional view taken on the line 8—8 of Fig. 2, showing the light-proof fastening means for the film magazine.

With reference now to Figs. 7 and 8, details of the magazine 30 are shown. In Fig. 7, the magazine 30 is shown with the cover removed and as shown is merely a felt-lined box with a thin film slot 31 having an aperture 31-A therein leading therefrom to serve as a film outlet. The felt lining is indicated by numeral 30-A. Preferably the film slot is also lined with felt or other suitable material to prevent the entry of light therethrough and minimize scratching of film. At opposing corners of the magazine are located hollow tubes 64, 65 which penetrate the magazine back 66 and which are externally threaded at the opposing ends thereof. With such an arrangement, a light-tight cover (not shown) may be placed over the open side after which placement it is held in position by nuts engaging the threaded portions of tubes 64 and 65. These nuts are indicated in Fig. 2 which shows a magazine (with cover) in place in the camera, being identified by numerals 67 and 68. The magazine is held in place by rod members 69, 70 protruding into the film chamber from the partition 27. The rod members are threaded at their outer ends for engagement with additional nuts 71, 72 to hold the closed magazine in place in the camera. For convenience it is desirable that the nuts 71, 72 be of the knurled variety so that they may be readily tightened or removed by hand.

Fig. 8 shows, in partly cut-away form, the magazine cover hold-down and magazine mounting arrangement indicating magazine body 30, felt lining 30-A, rod members 69, (70) tubes 64 (65), magazine cover nuts 67, 68, cover 73, and magazine hold-down nuts 71, (72).

Electrical circuity for controlling camera operation is shown in Fig. 10 to which reference is now directed. This circuit is intended to supply power to the motor 37 as well as power for energizing the clutch, the brake and suitable control elements therefor.

The universal availability of alternating current makes it desirable to provide circuity operative from an alternating current supply, however, it is practically imperative to employ direct current for energizing the clutch and the brake. Alternating current is applied to the power input terminals 74 from whence it is delivered via the double pole switch 75 to motor 37. Motor 37 may be of any suitable form, however, to permit speed adjustment it may be preferable to employ a series-type motor having a speed control device such as rheostat 76. Where speed adjustment is not particularly desirable, a so-called constant speed motor such as an induction motor may be used. Motor 37 drives the magnetic fluid clutch housing 46 through the belt 39 indicated schematically. Control solenoid 60, indicated schematically, is employed to operate the brake shoe 56. Direct current for the operation of the clutch and the brake is obtained by rectifying alternating current in the full wave bridge rectifier 77. The rectifier output is filtered by condenser 78. Relay 79 controls the application of power to either clutch 45 or to brake solenoid 60. The coil of relay 79 is connected to the alternating current supply through the contacts of a switch 80. Relay 79 includes an armature with front and back contacts connected in such manner that when relay 79 is energized, the brake solenoid 60 is actuated to apply the brake shoe 56 and the coil 50 of the magnetic clutch 45 is de-energized; and when relay 79 is not energized, the coil 50 of the clutch 45 is energized and the solenoid 60 is de-energized to release the brake. Switch 80 may be of any form suitable for the particular application at hand, for example, it may be a normally closed switch which is momentarily opened when camera operation is desired. Relay 79 is shown as being of the A.-C. operated type, however, it must be realized that operation with direct current applied to the relay coil could be used if considered desirable. Neon tube 35-B is shown schematically in Fig. 10 as being disposed in proximity to the sprocket 32. This tube is energized by an alternating current of known frequency. Typically it may be energized from the power source to provide flashes of light at twice the supply frequency or alternatively it may be energized by an independent supply. Double-pole, double-throw switch 81 selects the lamp energizing source and in the position shown will energize the lamp from the power supply 74. In the opposing position of switch 81, lamp 35-B will be energized by the power applied to terminals 82. Resistance 83 is placed in series with neon tube 35-B to limit the current through the tube to reasonably safe values.

Figure 9:
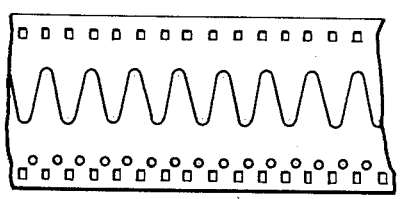
Fig. 9 is a plan view of a section of film showing the time record thereon.

Fig. 9 shows a typical section of film indicating a record such as would be obtained in photographing a cathode ray tube display of a sinusoidal signal of a typical frequency of 1000 cycles per second. Timing dots are indicated in proximity to one row of film perforations.

The camera thus far described is loaded for operation by filling the magazine 30 with a loose coil of film which may typically be 30 feet in length. A film reel or mandrel is not used to support the film as is considered standard practice because such a reel will increase the inertia which would have to be overcome in starting and stopping. After the loaded magazine is inserted in the camera, the film is threaded over the sprocket cogs and through the slot 33 into the lower or film take-up section of the film compartment. The camera is then in a loaded condition ready for operation. In operation of the camera, the part of the film that is to receive the light trace moves from the magazine into the take-up section where it accumulates in layers. A take-up reel is also avoided to further reduce the moving mass which must be started and stopped during operation.

In normal operation the switch 75 will usually be closed to set motor 37 into operation shortly before camera operation is desired. After motor 37 reaches operating speed, switch 80 may be opened to release the brake control solenoid 60, and activate the clutch to rotate shaft 34 and sprocket 32 to advance the film. When switch 80 is subsequently closed, the clutch is de-energized and the brake solenoid actuated to arrest rotation of shaft 34, thereby stopping advance of the film.

Figure 4:
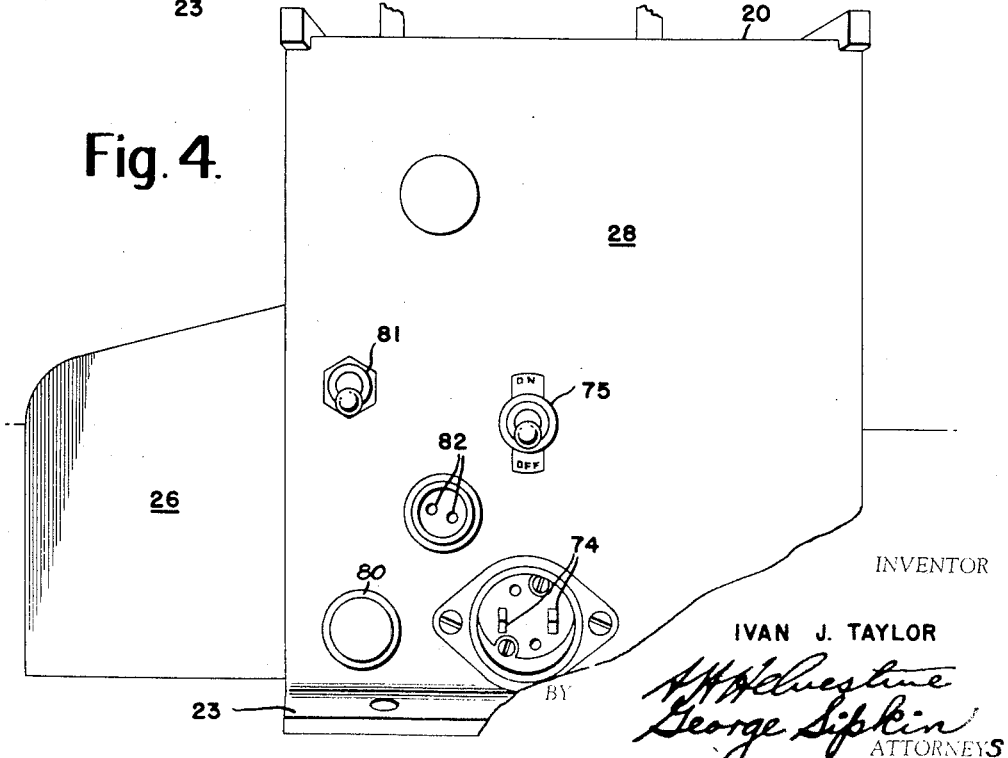
Fig. 4 is a rear elevational view in perspective.

Fig. 4 shows the rear panel 28 of a camera showing typical arrangement of switch and connectors, numbers shown therein corresponding to those previously given.

With reference now to Fig. 11, a variant embodiment of the basic features of the present invention is shown. This embodiment is basically similar to that previously described differing primarily in the sprocket drive and braking mechanism. This difference is centered in an improved braking mechanism which is mainly electrical in nature rather than a combination of electrical and mechanical as in the apparatus previously described. For simplicity, Fig. 11 is to be compared only to Fig. 6 and certain components have been deleted to avoid obscuring the essential difference. Fig. 11 includes the film drive sprocket 132 which is carried by shaft 134. Shaft 134 is journalled primarily by bearings 140, 141 which are carried by standards 122 and 123 respectively, the standards themselves being mounted on housing bracket 142. Shaft 134 is also journalled by bearing 120 which is mounted within the magnetic housing 124. Housing 124 is fixedly attached to standard 125 which in turn is mounted on housing bracket 142. Housing 124 forms a part of a second magnetic fluid device which is, however, employed as a brake rather than as a clutch. It is employed in preference to the partly mechanical brake arrangement previously described. Housing 124 contains an energizing coil 126 and a disc or braking member 127. The space within housing 124 between it and disc member 127 is filled with a magnetizable fluid mixture such as an oil containing carbonyl iron powder which when subjected to a magnetic field "solidifies" to hold disc member 127 against rotation with respect to the housing 124. An oil seal 128 is provided to retain the oil within the housing. Slip rings to the coil are not required because the housing is stationary and may be connected directly in the circuit connections which are simply made, the coil 126 being connected in place of the control solenoid 60 previously discussed.

The film-driving clutch assembly is quite similar to that previously described and shown in Fig. 6 with the basic exception that two oil seals are required instead of just one to permit extension of shaft 134 through to the brake disc member 127. Thus an oil seal 129 is included in addition to oil seal 149. Clutch housing 146 carries the pulley section 138 which engages a suitable belt (not shown) for coupling to a suitable driving motor. This housing 146 is rotatably journalled by bearings 147 and 148.

Clutch housing 146 contains coil 150 and disc member 144. As before, the clutch is filled with a magnetizable fluid. Current is supplied to coil 150 by way of slip rings 151 and 152 which are contacted by brushes 154 and 155. Slip rings 151 and 152 are insulated from the housing 146 by a disc 153 of suitable insulating material.

The device of the present invention employing the shaft assembly as shown in Fig. 11 provides a remarkable advancement over the prior art in that it permits a much higher uniform speed with much shorter acceleration and deceleration periods than any device known in the prior art. By way of example, a shaft speed of 6000 r.p.m. is readily attained to provide a linear film speed of 36 feet per second. In starting, this speed is reached in 6 milliseconds and approximately 3 inches of film travel; a similar braking time is normally employed, however, more rapid braking can be achieved without difficulty, if desired. Contributing to the rapid start is the ratio of the masses involved. In a specific embodiment tested, a clutch housing having a three-inch diameter and weighing approximately one pound, the weight being concentrated theoretically at a large radius, was used with a shaft assembly including the discs and sprocket attached which weighed a total of only about three or four ounces, most of which was concentrated at very small radius. Thus the clutch housing has much more inertia than the shaft and can readily supply considerable energy to the shaft without appreciable loss of speed.

The shaft 134 (as also shaft 34) is made of a strong diamagnetic material such as stainless steel to minimize flux leakage through the shaft itself and provide sufficient strength to withstand the high stresses involved in rapid starting and stopping.

From the foregoing discussion of the apparatus of the present invention it is apparent that considerable modification of the features of the present invention is possible within the scope thereof as defined by the appended claims.

What is claimed is:

1. A camera for exposing film in a continuous strip, comprising a housing provided with a plurality of spaced wall means, said wall means including a plurality of anti-friction bearing means arranged along a common axis, a single shaft carried in said anti-friction bearing means, a pair of circularly-toothed sprocket means secured to said shaft, said circularly-toothed sprocket means being axially spaced thereon a distance for engaging said film, a magnetic clutch comprising a driven disc, a driving electromagnetic member, and magnetic clutch fluid means therebetween, said disc being secured to said shaft, means for continuously driving said driving member, a film magazine adapted to contain a film wound upon solely itself, said magazine being on one side of said shaft and having an exit slot in line with the tops of said circularly-toothed sprocket means and relatively close thereto, a lens on the side of said shaft opposite said magazine and substantially on a level with the axis of said shaft, and means for energizing and de-energizing said clutch while said continuous driving means is operating.

2. A camera as defined in claim 1 wherein said sprocket means comprise hollow drums.

3. A camera as defined in claim 2 but further characterized by a brake means for said shaft inside a first of said sprockets.

4. A camera for exposing film in a continuous strip, comprising a housing provided with a plurality of spaced wall means, said wall means including a plurality of bearing means arranged along a common axis, a single shaft carried in said bearing means, a film advancing sprocket means secured to said shaft, a magnetic clutch comprising a driven disc, a driving electromagnetic member, and magnetic clutch fluid means therebetween, said disc being secured to said shaft, means for continuously driving said driving member, a film magazine adapted to loosely contain a film, said magazine being on one side of said shaft and having a film exit slot in line with and relatively close to said film advancing sprocket means, a lens substantially on a level with the axis of said shaft, and means for energizing and de-energizing said clutch while said continuous driving means is operating.

References Cited in the file of this patent

UNITED STATES PATENTS

| 1,824,469 | Dyche | Sept. 22, 1931 |
|---|---|---|
| 2,001,597 | Caps et al. | May 14, 1935 |
| 2,136,209 | Finch | Nov. 8, 1938 |
| 2,183,522 | Wittel et al. | Dec. 19, 1939 |
| 2,247,214 | Wagar | June 24, 1941 |
| 2,280,492 | Kenngott | Apr. 21, 1942 |
| 2,298,574 | Lockhart | Oct. 13, 1942 |
| 2,458,882 | Stoner et al. | Jan. 11, 1949 |
| 2,512,486 | Craig et al. | June 20, 1950 |
| 2,551,597 | Hall | May 8, 1951 |

FOREIGN PATENTS

| 344,958 | Germany | Dec. 2, 1921 |
|---|---|---|
| 629,428 | Great Britain | Sept. 20, 1949 |